(12) United States Patent
Markstein et al.

(10) Patent No.: US 7,065,758 B2
(45) Date of Patent: *Jun. 20, 2006

(54) OPTIMIZE CODE FOR A FAMILY OF RELATED FUNCTIONS

(75) Inventors: Peter Markstein, Woodside, CA (US); James W. Thomas, Sunnyvale, CA (US); Kevin Crozier, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 699 days.

This patent is subject to a terminal disclaimer.

(21) Appl. No.: 10/183,524

(22) Filed: Jun. 28, 2002

(65) Prior Publication Data

US 2003/0088861 A1  May 8, 2003

Related U.S. Application Data

(63) Continuation of application No. 09/964,769, filed on Sep. 28, 2001.

(51) Int. Cl.
G06F 9/45 (2006.01)

(52) U.S. Cl. .................................. 717/154; 717/141
(58) Field of Classification Search ......... 717/136–161
See application file for complete search history.

(56) References Cited

U.S. PATENT DOCUMENTS

| | | | | |
|---|---|---|---|---|
| 4,415,767 A | * | 11/1983 | Gill et al. ................ | 704/243 |
| 4,763,255 A | * | 8/1988 | Hopkins et al. ........... | 717/153 |
| 5,367,651 A | * | 11/1994 | Smith et al. .............. | 717/149 |
| 5,469,572 A | * | 11/1995 | Taylor ..................... | 717/152 |
| 5,724,590 A | * | 3/1998 | Goettelmann et al. ...... | 717/154 |
| 5,907,711 A | * | 5/1999 | Benitez .................... | 717/145 |
| 5,930,509 A | * | 7/1999 | Yates et al. ............... | 717/159 |
| 6,289,507 B1 | * | 9/2001 | Tanaka et al. ............. | 717/155 |
| 6,301,704 B1 | * | 10/2001 | Chow et al. .............. | 717/146 |
| 6,567,831 B1 | * | 5/2003 | Loginov ................... | 708/290 |
| 6,631,517 B1 | * | 10/2003 | Lamping et al. .......... | 717/151 |

* cited by examiner

*Primary Examiner*—Tuan Dam
*Assistant Examiner*—Andre R. Fowlkes

(57) ABSTRACT

A system to optimize code for a family of related functions. The system recognizes a function call as being a member of a family of related functions. For the member function, the system replaces the member call with corresponding family-start and member-finish function calls.

20 Claims, 3 Drawing Sheets

OPTIMIZE CODE FOR A FAMILY OF RELATED FUNCTIONS

CONTINUATION APPLICATION

The present application is a continuation of the following application of the common assignee, which is hereby incorporated by reference. The applicants claim priority of any and all subject matter disclosed therein:

U.S. patent application Ser. No. 09/964,769 filed on Sep. 28, 2001, entitled "EFFICIENT COMPILATION OF FAMILY OF RELATED FUNCTIONS".

FIELD OF THE INVENTION

This invention relates generally to optimizing functions. More specifically, this invention relates to optimizing code for a family of related functions.

BACKGROUND OF THE INVENTION

In computer programming, certain sets of functions may be related. In other words, for a given set of functions, the calculation for each member function of the set may be substantially identical. An example is a set of trigonometric functions, i.e., sine, cosine, tangent, cotangent, secant, and cosecant. Each trigonometric member function may be computed by first performing an argument reduction and some preliminary calculations. The argument reduction and the preliminary calculations are common to each trigonometric member function of the set. To calculate each respective member function, unique instructions are executed after performing the argument reduction and preliminary calculation.

Normally, when a conventional compiler encounters multiple trigonometric function statements in a program, a separate function call is made for each encountered trigonometric function. Thus, for example, if the conventional compiler encounters sin(theta) and cos(theta) statements within a program, two separate function calls are made, with each call executing all of the common instructions.

As an illustration, assume that the following statements appear in a computer program:
X=sin(theta);
Y=cos(theta);
The conventional compiler typically makes the following calls:
R1=call _sin(theta);
R2=call _cos(theta);

As noted above, many of the instructions to perform sine and cosine calculations are identical. For example, on the assignee's IA-64 computer architecture, each trigonometric function takes approximately 50 instructions to compute the respective function. Of these, approximately 48 instructions are identical for sine and cosine functions (the tangent function may also have the identical 48 instructions). This indicates that approximately two instructions are unique for the sine and cosine functions (tangent function requires approximately 12 unique instructions).

With the conventional compiler, as many as 100 instructions are performed to calculate the sine and cosine values. However, as many as 48 instructions are performed twice. This lengthens the execution time and the compiled program size. This penalty is multiplied as more member functions from the same family of functions are called, which causes the common instructions to be executed repeatedly by the running program.

Alternatively, special functions are available, which return all member functions (or most commonly used members) of a related family of functions. However, these special functions are typically non-standard. Accordingly, a programmer must know the names of the special functions to invoke and extract values of interest from the resultant computation. While special function calls may increase speed of execution, programs written with such special function calls suffer from non-portability. In other words, the programs become architecture specific and/or operating system specific.

SUMMARY OF THE INVENTION

In one embodiment of the present invention, a system to optimize code for a family of related functions includes a pre-optimizer configured to generate a pre-optimized code from a program wherein a member function call within the program is replaced with corresponding family-start and member-finish function calls, and an optimizer configured to generate an optimized code based on the pre-optimized code.

In another embodiment of the present invention, a system to generate a pre-optimized code includes a member recognizing module configured to recognize a member function from a family of related functions, a family-start calling module configured to make a family-start function call associated with the family of related functions based on output from the member recognizing module, a member-finish calling module configured to make a member-finish function call associated with the member function based on the output from the member recognizing module, and a pre-optimizing module configured to generate the pre-optimized code based on outputs from the member recognizing module, the family-start module, and the member-finish calling module.

BRIEF DESCRIPTION OF THE DRAWINGS

Features of the present invention will be explained in part from reference to the figures, in which.

DETAILED DESCRIPTION

For simplicity and illustrative purposes, the principles of the present invention are described by referring mainly to an exemplary embodiment or embodiments for optimizing code for a family of related functions. However, the scope of the present invention includes multiple families of related functions. The same principles are equally applicable to, and can be implemented in, many types of situations where it is desired to optimize code, and that any such variation does not depart from the true spirit and scope of the present invention.

Moreover, in the following detailed description, references are made to the accompanying figures, which illustrate specific embodiments in which the present invention may be practiced. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

A characteristic of a family of related functions is that a portion of the instructions performed are identical for each member function of the family. While not exhaustive, families of related functions include trigonometric functions (sin( ), cos( ), tan( ), etc.), hyperbolic functions (sin h( ), cos h( ), tan h( ), etc.), square root (sqrt( ) reciprocal_sqrt( )), and the like.

In one embodiment of the present invention, whenever a member function of a family of related functions is recognized, the call for the member function may be replaced by two calls—a family-start function call and a member-finish function call. The family-start function call is typically identical for all members of that particular family of related functions. Then, computation for each member function is completed by calling the member-finish function, which performs the unique instructions for each member function.

By replacing the original member function call with the corresponding family-start and member-finish function calls, significant savings may be realized, for example, by eliminating duplicate instructions. To illustrate, again consider the IA-64 computer architecture. As noted, as many as 48 out of 50 instructions are identical when computing sin(theta) and cos(theta). If the value of the argument theta is the same for both calls, then as many as 48 instructions may be eliminated. Thus, instead of executing 100 instructions, only 52 instructions may be executed. Savings become proportionately greater as other trigonometric function calls, such as tan(theta), are made.

Figure 1:
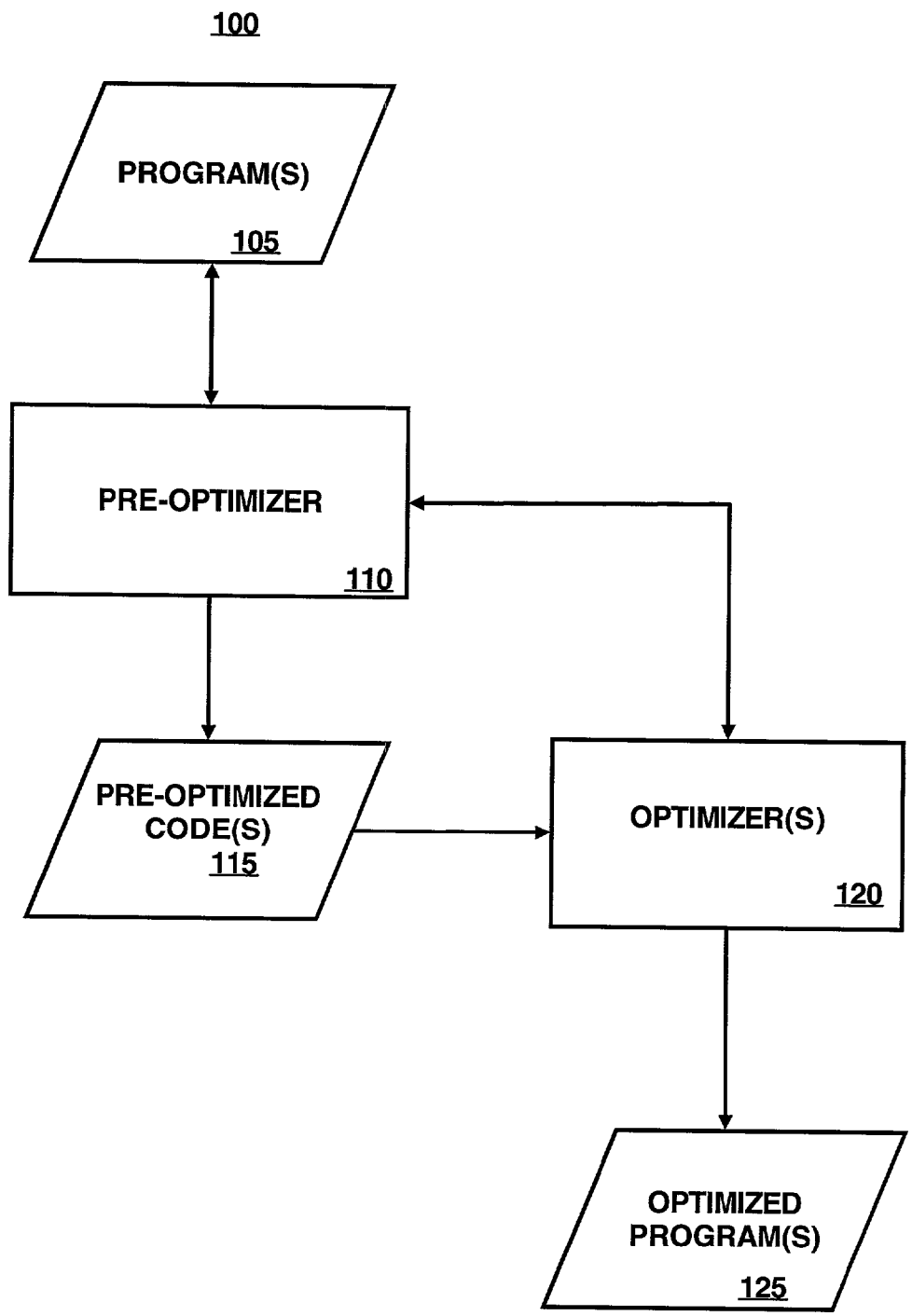
FIG. 1 illustrates an example block diagram of an embodiment of the present invention.

FIG. 1 illustrates an example block diagram of an embodiment of the present invention. As shown in FIG. 1, a system 100 to optimize a family of related functions may include a pre-optimizer 110 and an optimizer 120. The pre-optimizer 110 may be configured to receive as inputs a program 105 and generate as an output a pre-optimized code 115. The pre-optimized code 115 may be such that each member function call of the family of related functions in the program 105 is replaced by corresponding family-start and member finish function calls. The pre-optimized code 115 may be stored in a storage or may be directly outputted to the optimizer 120.

The optimizer 120 may be configured to generate a corresponding optimized program 125 based on the pre-optimized code 115. The optimizer may be configured to access the pre-optimized code 115 from the storage or may be configured to receive directly from the pre-optimizer 110 or both. The optimizer 120 may be configured to generate an optimized program 125 for a specific architecture and/or operating system. In this manner, using multiple optimizers 120, optimized codes 125 for multiple architectures and/or operating systems may be generated from a single pre-optimized code 115.

Figure 2:
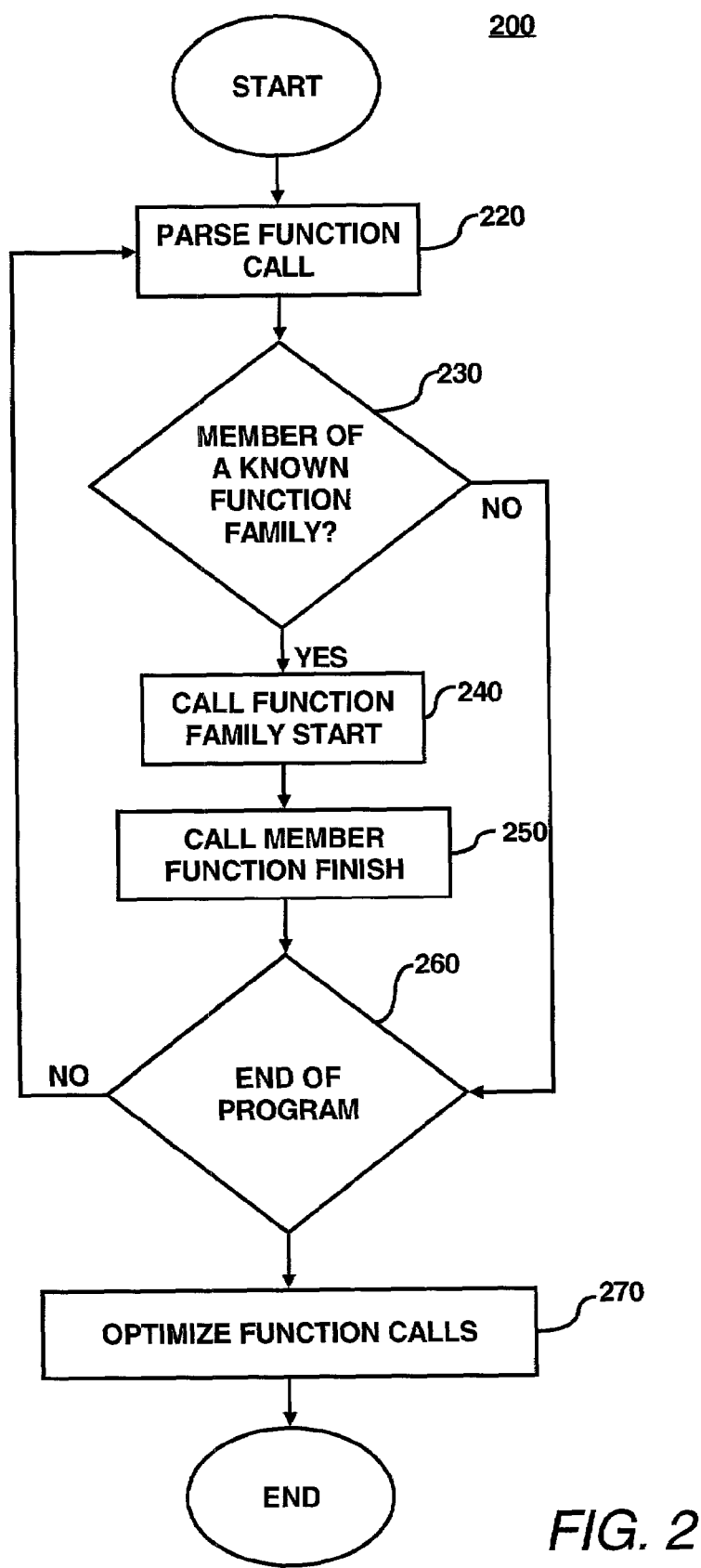
FIG. 2 illustrates an example flow chart of an embodiment of the present invention.

FIG. 2 illustrates an example flow chart of an embodiment of the present invention, which illustrates a method 200 for optimizing code for a family of related functions. The method 200 may be invoked by a compiler, through a command, by a software manager, and the like.

As shown in FIG. 2, the method 200 begins by parsing a program statement (step 220) of a program. If the program statement is a call to a member of a known family of related functions (step 220), then the method 200 replaces the program statement with calls to corresponding family-start (step 240) and member-finish functions (step 250). The method 200 then determines if an end of program has been reached (step 260). If the program statement is not a call to a member function, then the program statement is passed through unchanged and step 260 is performed.

If the end of the program is not reached in step 260, the method 200 iterates to step 220 to parse more program statements from the program. The steps 220–260 may be characterized as the pre-optimizing phase where a pre-optimized code for the program is generated.

If the end of the program is reached in step 260, the method 200 may optimize (step 270) the pre-optimized code.

Note that the pre-optimized code may be generated as each program statement is parsed and processed. To illustrate, again assume that the following statements appear in a computer program:
X=sin(theta);
Y=cos(theta);

According to method 200, the statement X=sin(theta) is parsed in step 220. In step 230, the function call sin(theta) is recognized as being a member of a known family of related functions, namely the trigonometric family of functions. Because the function call sin(theta) is recognized to be a member a known family, steps 240 and 250 are performed. The result after performing steps 240 and 250 may appear as follows:
R1=call _trigstart(theta);
R2=call _sinfinish(R1);

The method 200 determines the end of program is not reached in step 260 and iterates back to step 220 to parse the statement Y=cos(theta). Then the function call cos(theta) is treated in a similar manner and the result may appear as follows:
R3=call _trigstart(theta);
R4=call _cosfinish(R3);

Thus, prior to entering step 270 for optimization, the original program statements may be translated as follows:
R1=call _trigstart(theta);
R2=call _sinfinish(R1);
R3=call _trigstart(theta);
R4=call _cosfinish(R3);

It is seen that whenever member functions are recognized, the method 200 replaces each member function with the appropriate family-start and member-finish function calls regardless of whether or not the same family-start function call has been made previously. The end result of this process may be a pre-optimized code that appears to be inefficient at a first glance. From the example given above, a trigonometric family-start function call _trigstart( ) is made twice with the same argument theta. This occurs because the method 200 replaces the program statement Y=cos(theta) with the family-start function _trigstart( ), followed by the unique member-finish function _cosfinish( ), even though the same family-start function call _trigstart( ) was made previously due to the presence of the program statement X=sin(theta).

However, after this replacement process is completed, the pre-optimized code, which may include multiple family-start function calls, may be treated as ordinary instructions during the optimization step 270. Thus, the family-start and member-finish functions, as well as other ordinary instructions, are subject to optimization techniques. These techniques may include common subexpression elimination, code motion, and dead-code elimination. In this instance, during the optimization performed at step 270, an elimination routine recognizes that R1 and R3 are identical because they both result from calling _trigstart( ) with the same argument theta. The optimization performed at step 270 transforms the above code and the result may appear as follows:

R1=call _trigstart(theta);
R2=call _sinfinish(R1);
R4=call _cosfinish(R1);

When the optimization is completed, the total number of instructions is reduced since the second call to _trigstart( ), taking up to 48 instructions for the IA-64 architecture, is eliminated. This reduces both the size and execution time of the compiled program.

Figure 3:
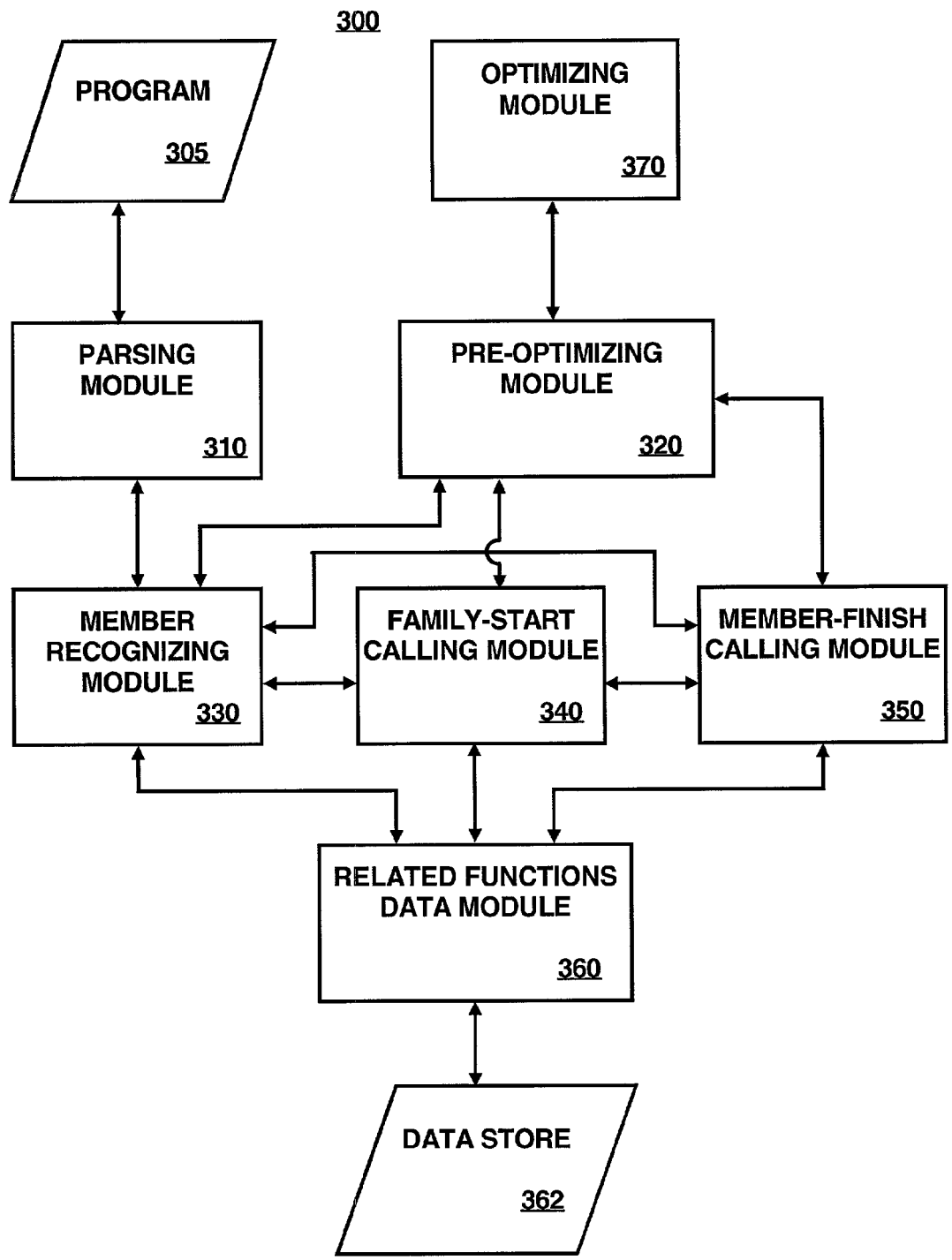
FIG. 3 illustrates an example detailed block diagram of an embodiment of the present invention.

FIG. 3 illustrates an example of a detailed block diagram of a system 300 for optimizing code for a family of related functions according to an embodiment of the present invention. The system 300 may include a parsing module 310, a pre-optimizing module 320, a member recognizing module 330, a family-start calling module 340, a member-finish calling module 350, a related functions data module 360 with a data store 362, and an optimizing module 370.

The parsing module 310 may be configured to parse program statements from a program 305. The program 305 may be written in a variety of languages such as C, C++, Java, J++, and the like. Each program statement may be passed as input to the member recognizing module 330.

The pre-optimizing module 320 may be configured receive outputs from the member recognizing module 330, the family-start calling module 340, and the member-finish calling module 350 and configured to generate a pre-optimized code 325 in a storage. The pre-optimizing module 320 may also directly output the pre-optimized code 325 to the optimizing module 370.

The member recognizing module 330 may be configured to recognize a member function from the family of related functions. In one embodiment of the present invention, the knowledge of the family of related functions may be internal to the member recognizing module 330 itself. In another embodiment, the knowledge may be provided through the related functions data module 360, as will be discussed below.

If the member recognizing module 330 recognizes a program statement from the parsing module 310 as being a member function of a known family of functions, the member recognizing module 330 may pass the program statement to the family-start calling module 340 and the member-finish calling module 350. If the member recognizing module 330 does not recognize the program statement as being a member function of a known family of functions, the member recognizing module 330 may pass the program statement to the pre-optimizing module 320.

The family-start calling module 340 may be configured to generate an appropriate family-start function call for a program statement recognized as being a member of a known family of functions. In one embodiment of the present invention, the knowledge the family-start function calls may be internal to the family-start calling module 340 itself. In another embodiment, the knowledge may be provided through the related functions data module 360. The family-start calling module 340 may be configured to pass the family-start function call to the pre-optimizing module 320.

The member-finish calling module 350 may be configured to generate an appropriate member-finish function call for a program statement recognized as being a member of a known family of functions. In one embodiment of the present invention, the knowledge the member-finish function calls may be internal to the member-finish calling module 350 itself. In another embodiment, the knowledge may be provided through the related functions data module 360. The member-finish calling module 350 may be configured to pass the member-finish function call to the pre-optimizing module 320.

As noted above, in one embodiment of the present invention, the member recognizing module 330, family-start calling module 340, and/or the member-finish calling module 350 may be configured to internally contain the knowledge associate with the family of related functions. Performance may be enhanced since the family of related functions may be quickly recognized by the individual modules themselves.

However, flexibility may also be enhanced through the related functions data module 360. The related functions data module 360 may be configured to service requests for information from the member recognizing module 330, family-start calling module 340, and/or the member-finish calling module 350. For example, the member recognizing module 330 may request information on whether a particular program statement is a member function of a known family of related functions; the family-start calling module 340 may request information regarding the appropriate family-start function call for the member function; and/or the member-finish calling module 350 may request information regarding the appropriate member-finish function call for the member function.

The information about the family of related functions may be contained in a data store 362. The data store 362 may be an ASCII file, a binary file, a database file, a look-up table, and the like. Note that multiple data stores 362 may be utilized. In this manner, updating knowledge regarding the family of related functions does not require changes to the actual compiler executable. Updating simply requires changes to the data store(s) 362; the compiler may continue to work in the same manner regardless of the information in the data store(s) 362. Also, custom families of related functions may be added to the data store(s) 362 and receive similar efficiency improvements. In addition, no special knowledge is required on the part of the programmer.

Note that any of the member recognizing module 330, the family-start calling module 340, the member-finish calling module 350, and/or the related functions data module 360 may be configured to contain knowledge regarding multiple families of related functions.

In one embodiment, the member recognizing module 330, the family-start calling module 340, and/or the member-finish calling module 350 may be configured to query the related functions data module 360 to determine if a program statement is a member of a known family of related functions, and to determine the appropriate family-start function and member-finish function calls. In this manner, flexibility is enhanced since only the related functions data module 360 need to be updated as more and more families of related functions become known. No changes to the member recognizing module 330, family-start calling module 340, and the member-finish calling module 350 are required to update the list of families of related functions. Also, as noted above, if the information is stored in the data store(s) 362, the related functions data module 360 need not be modified to update the information regarding families of related functions.

Combination(s) of the above strategies may be used. For example, in another embodiment, the member recognizing module 330, family-start calling module 340, and/or the member-finish calling module 350 may be configured to internally contain the knowledge of families of related functions that are frequently encountered and information about other families of functions may be queried from the related functions data module 360. In this manner, the frequently encountered families of functions, such as trigonometric and hyperbolic families, may be quickly recognized to enhance performance. At the same time, flexibility may be retained to update the families of related functions as necessary.

In a further embodiment, on an first occurrence of a function call for a particular family of related functions, the member recognizing module 330, the family-start calling module 340, and/or the member-finish calling module 350 may be configured to inquire the related functions data module 360. The related functions data module 360 may be configured to send entire information regarding the particular family to the member recognizing module 330, the family-start calling module 340, and/or the member-finish calling module 350. The information may be buffered by the respective modules 330, 340, and/or 350 as necessary. Then on subsequent occurrences of functions from that particular family, the related functions data module need not be queried again, which in turn may enhance performance.

For example, on a first occurrence of trigonometric function such as sin( ), information of all trigonometric functions, returned from the related functions data module 360, may be buffered by the member recognizing module 330, the family-start calling module 340, and the member-finish calling module 350. Then on subsequent occurrences of trigonometric functions such as cos( ) or tan( ), the related functions data module 360 need not be queried again, at least for the remainder of the compilation session.

In yet another embodiment, any of the member recognizing module 330, the family-start calling module 340, and the member-finish calling module 350 may be configured to contain internal knowledge of the frequently called families of related functions and buffer information about other families as they occur during the program parsing.

Again, it bears repeating that the invention is not limited to trigonometric, hyperbolic, and square root functions. The scope of the invention includes any or all families of related functions. Note that the knowledge of the families of related functions need not be internal to the member recognizing module 330, the family-start calling module 340, or the member-finish calling module 350. Indeed, in some instances, it may be preferred that the information about a family of functions be made available from an external source such as the data store(s) 362. The relation functions data module 360 enables such knowledge to be maintained externally. Also, The programmer may write code in a standard language (C, C++, J++, FORTRAN, etc). Thus, portability of the source code is maintained.

It has been described above that any of the member recognizing module 330, family-start calling module 340, and the member-finish calling module 350 may inquire the related functions data module 360 to receive information about a family or families of related functions. However, while not shown, in another embodiment of the present invention, any of the member recognizing module 330, family-start calling module 340, and the member-finish calling module 350 may directly access the data store(s) 362 to retrieve the necessary information.

The optimizing module 370 may be configured to generated an optimized code from the pre-optimized code 325. The optimizing module 370 may utilize standard optimizing techniques and thus need not be discussed in further detail. Note that there may be multiple optimizing modules 370, with each one configured to generate an optimized code tailored for a specific architecture and/or a specific operating system.

Any of the modules of the system 300 may be incorporated into a compiler. However, it is preferred that the data store(s) 362 be separate from the executable of the compiler. In this manner, knowledge about families of related functions may be updated and modified without having to modify the compiler itself. Also, any of the modules of the system 300 may be incorporated into other phases of compiling. For example, the transformation of the original function calls to the family start and member finish calls may be performed during a prepass phase of the compilation.

Note that the family-start and member-finish calls may be made to appear as primitive instructions in an intermediate language, i.e., a language independent of specific architectures and independent of specific operating systems. If the family-start and member-finish calls are made to appear as primitive instructions, the optimizer may perform optimization on these calls made in the same intermediate language.

The intermediate language code, whether optimized at the intermediate language level or not, may undergo an architecture specific optimization. For example, the compiler may in-line expand one or both the family-start and member-finish functions to take advantage of hardware parallelism that a particular architecture provides. The code may also undergo an operating system specific optimization. In these instances, certain operating system calls may allow access to the hardware resources faster than other operating system calls.

In one embodiment, the call to the family-start function may return a structure of values. For example, in an example implementation of the trigonometric family of functions, the angular argument theta may be broken into two angles A and B, wherein sin(A) and cos(A) are obtained quickly from a look-up table and sin(B) and cos(B) are quickly computed by a short polynomial. The final result may be then computed from well-known trigonometry identities:

sin(theta)=sin(A+B)=sin(A)cos(B)+cos(A)sin(B);
cos(theta)=cos(A+B)=cos(A)cos(B)−sin(A)sin(B);

Then, it may be convenient to have _trigstart( ) return four values, corresponding to sin(A), cos(A), sin(B) and cos(B), as shown by the following declaration in the C programming language:

```
typedef struct {
    double sina;
    double cosa;
    double sinb;
    double cosb;
} trigreturn;
```

Then the functions sinfinish( ) and _cosfinish( ) can be described in the C programming language as follows:

```
_sinfinish(trigreturn x) {
    double temp;
    temp = x.sina * x.cosb;
    return fma (x.cosb, x.sina, temp) ;
}
    and
_cosfinish(trigreturn x) {
    double temp;
    temp = x.cosa * x.cosb
    return fma (-x.sina, x.sinb, temp) ;
}
```

For informational purposes, fma( ) is a function introduced into the C99 standard for the C language. Thus using the fma( ) function does not destroy portability. A call to fma (a,b,c) computes a*b+c with only one rounding, after the sum has been computed. On architectures such as IA-64, Power PC™, and PA-RISC™, fma( ) is available as a single machine-language instruction.

Also, many architectures such as IA-64, Power PC™, and PA-RISC™ contain variants of fma( ) to compute a*b−c (often called fms( )) and −a*b+c (often called fma( )). With these architectures, the compiler can replace an fma( ) call with one of its arguments negated with one of the alternate instructions, which avoids an extra operation to actually negate that argument.

When compiling for architectures lacking the fma( ) instruction, the finish routines may be rewritten in terms of simple addition and multiplication, with a slight loss of accuracy, but retaining relatively high performance. Examples of such architectures are IA-32™ and Sparc™.

In another implementation of the trigonometric functions, the completely evaluated approximating polynomials for sin(B) and cos(B) are not returned. Instead, the value B itself is returned, as well as approximations to sin(B)/B, and (cos(B)−1)/B. While these quantities may appear to be complicated, the sin(B)/B results from omitting the final multiplication of an approximating polynomial to sin(B) by B. Likewise, (cos(B)−1)/B results from omitting the final constant term 1 from the cosine approximation, as well as omitting a multiplication by B. This seemingly more complicated approach leads to slightly better accuracy, at no cost in additional computation. The _trigstart( ) routines may be shorter, and the member-finish function routines may be slightly longer.

For this implementation, the defining structure may look like the following:

```
typedef struct {
    double b;
    double sina;
    double cosa;
    double sseriesb;
    double cseriesb;
} trigreturn2;
```

The finishing member functions may become one instruction longer each as shown below:

```
_sinfinish(trigreturn2 x) {
    double temps;
    temps = x.sina * x.cseriesb;
    temps = fma (x.sseriesb, x.cosa, temps) ;
    return fma (temps, x.b, x.sina) ;
}
and
_cosfinish(trigreturn2 x) {
    double tempc;
    tempc = x.cosa * x.cseriesb;
    tempc = fma (-x.sina, x.sseriesb, tempc) ;
    return fma (tempc, x.b, x.cosa) ;
}
```

In yet another implementation of the trigonometric functions, the call to the family-start function returns a structure with resultant values of all member functions. In this instance, the defining structure may look like the following:

```
typedef struct {
    double sinresult;
    double cosresult;
} trigreturn3;
```

For this implementation, the _sinfinish(x) and _cosfinish (x) may simply refer to the x.sinresult and x.cosresult quantities, respectively.

Hyperbolic functions lend themselves to a substantially similar treatment to the trigonometric functions.

Square root and reciprocal square root also lend themselves to this methodology. Often, to calculate the square root, the reciprocal square root is calculated first, and then the square root is derived from the reciprocal square root. Using the exemplary methodology outlined above, the family-start function, perhaps named _rsqrt( ) may return the reciprocal square root itself. In this instance, because only a single value is returned, a structure associated with the result may not be necessary.

The finishing routine, perhaps named_sqrtfinish( ), using the result named recip from _rsqrt (x), may look like the following:

```
double _sqrtfinish (double x, double recip)
{
    double root, d;
    root = x * recip; // may leave a rounding error
    d = fma (root, root, -x) ;
    return fma (d, 0.5 * recip, root) ; // correctly rounded
}
```

Thus when the compiler encounters a sqrt(x), the compiler may simply insert recip=_rsqrt(x) followed by a call to _sqrtfinish(x, recip). However, if the compiler encounters sqrt(x) as a denominator of an expression, for example 1/sqrt(x), it may simply insert recip=_rsqrt(x) and use the value recip as the result of 1/sqrt(x), and the finishing routine can be empty.

This technique for square roots is of particular importance in graphics rendering where the reciprocal square root is used more frequently than the square root itself.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A computer-implemented system to optimize code for a family of related functions, comprising:
   a pre-optimizer configured to generate a pre-optimized code from a program wherein a member function call within the program is replaced with corresponding family-start and member-finish function calls,
   wherein the pre-optimizer is configured to recognize the member function call as a call to a member function that is included in a family of related mathematical functions and each member function of the family of related mathematical functions is operable to be executed using a set of instructions and a portion of the set of instructions for each member function are identical, wherein the family-start function call is a call to a family-start function performing the identical set of instructions for each member function and the member-finish function call is a call to a member-finish function performing instructions unique to the member function; and an optimizer configured to generate an optimized code based on the pre-optimized code.

2. The system of claim 1, wherein the optimizer is configured to generate the optimized code tailored for at least one of a specific computer architecture and a specific computer operating system.

3. The system of claim 1, wherein the optimizer is configured to receive the pre-optimized code directly from the pre-optimizer or retrieve the pre-optimized code from a data storage or both.

4. A computer-implemented system to generate a pre-optimized code from a program, comprising:

a member recognizing module configured to recognize a member function from a family of related mathematical functions, wherein each member function of the family of related mathematical functions is operable to be executed using a set of instructions and a portion of the set of instructions for each member function are identical;

a family-start calling module configured to make a family-start function call associated with the family of related mathematical functions based an output from the member recognizing module, wherein the family-start function call is a call to a family-start function performing the identical set of instructions for each member function;

a member-finish calling module configured to make a member-finish function call associated with the member function based on the output from the member recognizing module, wherein the member-finish function call is a call to a member-finish function performing instructions unique to the member function; and a pre-optimizing module configured to generate the pre-optimized code based on outputs from the member recognizing module, the family-start module, and the member-finish calling module.

5. The system of claim 4, further comprising:

a related functions data module configured to manage information regarding at least one family of related functions and configured to provide the information to at least one of the member recognizing module, family-start calling module, and member-finish calling module.

6. The system of claim 5, wherein the related functions data module manages the information through a data store.

7. The system of claim 6, wherein at least one of the member recognizing module, family-start calling module, and member-finish calling module access the data store directly.

8. The system of claim 4, wherein at least one of the member recognizing module, family-start calling module, and member-finish calling module internally contain knowledge of the family of related functions.

9. The system of claim 4, wherein at least one of the member recognizing module, the family-start calling module, and the member-finish calling module queries the related functions data module to retrieve information regarding the family of related functions from the related functions data module.

10. The system of claim 9, wherein at least one of the member recognizing module, the family-start calling module, and the member-finish calling module buffers the information regarding the family of related functions.

11. The system of claim 4, further comprising:

a parsing module configured to parse a program and output results to the member recognizing module.

12. The system of claim 4, further comprising:

an optimizing module configured to generate an optimized code based on the pre-optimized code.

13. The system of claim 12, wherein the optimizing module is configured to generate the optimized code tailored for at least one of a specific computer architecture and a specific computer operating system.

14. The system according to claim 1, wherein the optimizing module is configured to receive the pre-optimized code directly from the pre-optimizing module or retrieve the pre-optimized code from a data storage or both.

15. A computer-implemented system to generate a pre-optimized code from a program, comprising:

means for recognizing a member function from a family of related mathematical functions, wherein each member function of the family of related mathematical functions is operable to be executed using a set of instructions and a portion of the set of instructions for each member function are identical;

means for making a family-start function call associated with the family of related mathematical functions based on an output from the member recognizing module, wherein the family-start function call is a call to a family-start function performing the identical set of instructions for each member function;

means for making a member-finish function call associated with the member function based on the output from the means for recognizing, wherein the member-finish function call is a call to a member-finish function performing instructions unique to the member function; and means for generating the pre-optimized code based on outputs from the means for recognizing, the means for making the family-start function call, and the means for making the member-finish function call.

16. The system of claim 15, further comprising:

means for managing information regarding at least one family of related functions and providing the information to at least one of the means for recognizing, the means for making the family-start function call, and the means for making the member-finish function call.

17. The system of claim 15, further comprising:

means for parsing a program and output results to the means for recognizing.

18. The system of claim 15, further comprising:

means for generating an optimized code based on the pre-optimized code.

19. The system of claim 18, wherein the optimized code is tailored for at least one of a specific computer architecture and a specific computer operating system.

20. The system according to claim 15, wherein the means for generating optimized code receives the pre-optimized code directly from the means for generating pre-optimized code or retrieves the pre-optimized code from a data storage or both.

* * * * *

UNITED STATES PATENT AND TRADEMARK OFFICE
CERTIFICATE OF CORRECTION

| | | |
|---|---|---|
| PATENT NO. | : 7,065,758 B2 | Page 1 of 1 |
| APPLICATION NO. | : 10/183524 | |
| DATED | : June 20, 2006 | |
| INVENTOR(S) | : Peter Markstein et al. | |

It is certified that error appears in the above-identified patent and that said Letters Patent is hereby corrected as shown below:

In column 11, line 33, in Claim 4, after "based" insert -- on --.

Signed and Sealed this

Twenty-fourth Day of February, 2009

JOHN DOLL
*Acting Director of the United States Patent and Trademark Office*